Patented Aug. 14, 1928.

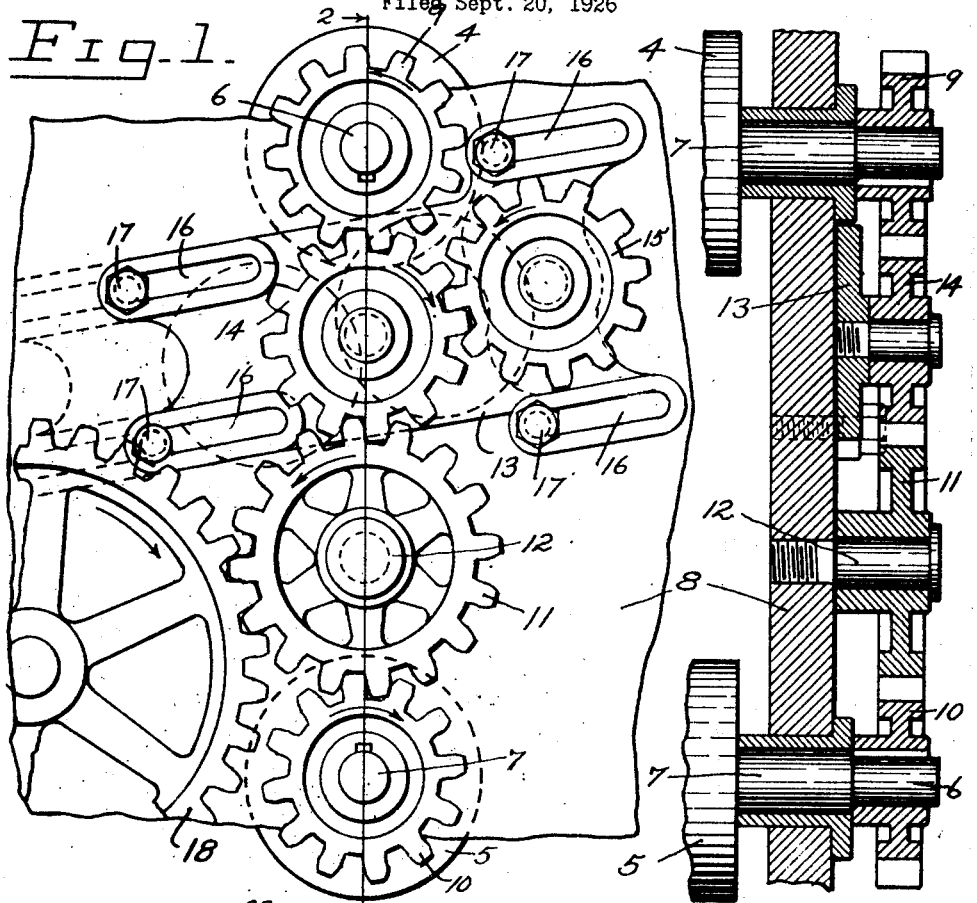

1,680,676

UNITED STATES PATENT OFFICE.

HARRY GEARING, OF LOS ANGELES, CALIFORNIA, ASSIGNOR TO NEBRASKA PRINTING COMPANY, OF LINCOLN, NEBRASKA.

MEANS FOR REVERSING ROLLERS AND THE LIKE RELATIVE TO EACH OTHER.

Application filed September 20, 1926. Serial No. 136,496.

My invention is particularly designed and adapted for use in reversing the rollers of printing machinery relative to each other, although it is to be understood that it is not limited to this particular use, but that it can be adapted to other uses where it is desired to reverse revolving elements relative to each other.

In order to explain my invention, I have illustrated it on the accompanying sheet of drawings in connection with two rollers which are adapted to be driven in opposite directions and which can be reversed relative to each other by my simple and practical device.

In the drawings Figure 1 is a face view of a device embodying my invention, showing a train of gears in mesh with each other and the ends of two rollers;

Figure 2 is a sectional view thereof taken on line 2—2 of Fig. 1; and

Figure 3 shows a slightly modified form of mechanism embodying my invention.

In illustrating my invention, I have shown it in a printing mechanism where it is desirable at times to reverse the direction of certain rollers relative to each other. In the drawings, 4 and 5 designate two rollers on shafts, 6 and 7, mounted in side members, only one of which is shown, designated 8, and on the outside of said side member, 8, on the outer ends of said shafts, 6 and 7, are mounted two gears, 9 and 10. On the side frame 8, in mesh with the gear, 10, is a gear, 11, mounted on a boss, or bearing bolt, 12, secured into the side member 8. Slidably mounted on said side member, 8, is a carrier member, or plate, 13, on which is a gear, 14, and a gear, 15, in mesh with each other, said carrier member being provided with four loops, as 16, 16, by means of which it is adjustably, or slidably secured to the side member, 8, by the bolts, 17, 17. The gear 14, is shown in mesh with the gears 9 and 11, as well as with the extra gear, 15, which runs idle in the position shown in full lines. The gear 14 is an intermediate gear between the gears 9 and 11, and is movable laterally as the carrier member, 13, is moved to the left, said gear 14, being moved out of mesh with gear 9, but not disengaged from gear 11, while gear, 15, is moved into mesh with gear, 9, and retains its mesh with gear, 14, for they move together on the member 13. This movement operates to reverse the direction of rotation of gears 9 and 10 and the rollers, 4 and 5, as will be clear by tracing the drive from gear to gear. It is only necessary to loosen the bolts or screws, 17, 17, and slide the plate or carrier member, 13, in the direction of its length, in one direction or the other to cause the reversal of the drive to the rollers 4 and 5. The shifted position of the gears 14 and 15 to accomplish this reversal is indicated by the light broken lines. The train of gears, in this embodiment of the invention is driven from a larger gear, 18, shown in mesh with gear, 11.

In Fig. 3, I have shown a train of three gears in horizontal alinement, the outer gears being designated, 20 and 21, and the intermediate gear, 22, said outer gears driving two rollers, or elements, 23 and 24. On the frame member, designated 25, is mounted a carrier member, 26, having the four loops, 27, 27, through which it is adjustably secured to the side member, 25, by the bolts, 28, 28, clearly illustrated. Said carrier member 26, has mounted thereon the intermediate gear, 22, by means of a bearing bolt, 29, and also carries an extra gear, 30, on a bearing element, 31, said extra gear being in constant mesh with the intermediate gear, 22, as shown. The direction of rotation of the outer gears 20 and 21 and the intermediate gear, 22, is indicated in full arrows, while the reverse direction is accomplished by shifting the carrier member, 26, upwardly until the intermediate gear 22, is moved out of mesh with outer gear, 20, while retaining its mesh with outer gear, 21, and the extra gear, 30, is moved into mesh with outer gear, 20, retaining its mesh with the intermediate gear 22.

Thus by the simple adjustment of the carrier member, 26, or the carrier member 13, in Figs. 1 and 2, the reversal of the direction of rotation is accomplished. Said carrier member in each case being a flat plate member mounted on the side of the frame member and taking little or no room and being adjustable in straight lines in these forms of the invention, and with a minimum of tools and work, and without detaching any parts and substituting other parts.

While I have illustrated my invention on the accompanying sheet of drawings, I do not limit the invention to this showing as to details of construction and arrangement, except as I may be limited by the hereto appended claims.

I claim:

1. In printing machinery, in combination, a frame member, spaced rollers supported in said frame member, means for reversing the direction of rotation of said rollers relative to each other, said means including three gears, one of said gears being in mesh with the other two gears, a carrier member having bolt receiving loops for adjustably mounting it on said frame member, said carrier member being movable crosswise of the line of said three gears, said carrier member having an extra gear and said one or intermediate gear mounted thereon in mesh with each other and moving therewith, said carrier member being movable to move said one gear out of mesh with one of said other two gears and to move said extra gear into mesh with said other gear, whereby all four gears are moved into mesh with each other.

2. In printing machinery, in combination, a frame having two side members, two rollers mounted therein with their shafts extended through one of said side members in spaced relationship, gears on the outer ends of said shafts on the outer side of said side member, a carrier member having bolt receiving loops for adjustably mounting it on the outside of said side member between said gears, said carrier member being movable crosswise of the line of said gears, said carrier member having two gears mounted thereon in permanent mesh with each other, one of said gears being in mesh with one of said first mentioned gears, said carrier being movable to move said one gear out of mesh with said first mentioned gear and its other gear into mesh therewith, whereby said gears are made adjustable for reversing the relative direction of rotation of said rollers.

Signed at Los Angeles, Los Angeles County, California, this 27th day of August, 1926.

HARRY GEARING.